(12) United States Patent
Wada

(10) Patent No.: US 9,990,701 B2
(45) Date of Patent: Jun. 5, 2018

(54) IMAGE-PROCESSING APPARATUS, IMAGE-PROCESSING METHOD, AND COMPUTER PROGRAM PRODUCT

(71) Applicant: PFU LIMITED, Ishikawa (JP)

(72) Inventor: Tomoaki Wada, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 41 days.

(21) Appl. No.: 15/202,234

(22) Filed: Jul. 5, 2016

(65) Prior Publication Data
US 2017/0270642 A1    Sep. 21, 2017

(30) Foreign Application Priority Data

Mar. 18, 2016    (JP) .................................. 2016-056252

(51) Int. Cl.
| | | |
|---|---|---|
| *G06K 9/40* | (2006.01) | |
| *G06T 5/00* | (2006.01) | |
| *G06T 5/30* | (2006.01) | |
| *G06T 5/50* | (2006.01) | |

(52) U.S. Cl.
CPC ................ *G06T 5/002* (2013.01); *G06T 5/30* (2013.01); *G06T 5/50* (2013.01); *G06T 2207/30176* (2013.01)

(58) Field of Classification Search
CPC .. G06T 5/002; G06T 5/30; G06T 5/50; G06T 2207/30176
USPC ................................................. 382/275, 308
See application file for complete search history.

(56) References Cited

U.S. PATENT DOCUMENTS

| | | | |
|---|---|---|---|
| 9,710,891 B2* | 7/2017 | Sakamoto | ................. G06T 5/00 |
| 2016/0191882 A1* | 6/2016 | Nakajima | ................. G06T 7/11 |
| | | | 382/167 |

FOREIGN PATENT DOCUMENTS

| | | |
|---|---|---|
| JP | 8-138049 A | 5/1996 |
| JP | 2003-168119 A | 6/2003 |
| JP | 2012-156839 A | 8/2012 |

OTHER PUBLICATIONS

Decision to Grant issued in corresponding Japanese Patent Application No. 2016-056252, dated Mar. 21, 2017.
Ken Kanematsu et al., "A Segmentation Method for Binary Image by Morphological Image Processing," Proceedings of the 2011 IEICE General Conference, Information/System 2, The Institute of Electronics, Information and Communication Engineers, Feb. 28, 2011, p. 15.
Osamu Unno et al., "Handbook of Image Analysis (Revised Edition)," Japan, University of Tokyo Press, Fumihiko Gomi, Sep. 10, 2004, vol. 1, pp. 1823-1825.

* cited by examiner

*Primary Examiner* — Daniel Mariam
(74) *Attorney, Agent, or Firm* — McDermott Will & Emery LLP

(57) ABSTRACT

According to the present disclosure, an image-processing apparatus acquires horizontal black hat image data by taking a difference between source image data and horizontal closing image data obtained by performing closing processing on each pixel row of the source image data, acquires vertical black hat image data by taking a difference between the source image data and vertical closing image data obtained by performing the closing processing on each pixel column of the source image data, and acquires logical conjunction image data where a logical conjunction of the horizontal black hat image data and the vertical black hat image data is taken.

20 Claims, 6 Drawing Sheets

EROSION          EROSION + DILATION

IMAGE-PROCESSING APPARATUS, IMAGE-PROCESSING METHOD, AND COMPUTER PROGRAM PRODUCT

CROSS-REFERENCE TO RELATED APPLICATION

This application is based upon and claims the benefit of priority from Japanese Patent Application No. 2016-056252, filed on Mar. 18, 2016, the entire contents of which are incorporated herein by reference.

BACKGROUND OF THE INVENTION

1. Field of the Invention

The present disclosure relates to an image-processing apparatus, an image-processing method, and a computer program product.

2. Description of the Related Art

Techniques for performing image processing of dot images have been conventionally disclosed.

The following technique is disclosed by JP-A-2003-168119: a technique of repeating collation with respect to a binary image while repeating correction using dilation processing of a dot character by using, as a structuring element, four pixels adjacent to a pixel of interest from the top, bottom, left and right, until the shape of the dot density obtained by projecting the dot character coincides with an aimed pattern.

The following technique for separating a halftone dot area and a character area in a binary image is disclosed by JP-A-2012-156839: a technique of finding a candidate of halftone dot area by dilation processing and erosion processing by using, as a structuring element, eight pixels adjacent to and centered on a pixel of interest, and when the area size is small, deciding that the character is false-detected and detecting only the halftone dot area.

However, the conventional image-processing apparatus (see JP-A-2003-168119, for example), which performs a morphological operation on only a binary image and performs recognition processing and separation processing, has a problem of not capable of performing correction processing on a multivalent image.

SUMMARY OF THE INVENTION

It is an object of the present disclosure to at least partially solve the problems in the conventional technology.

An image-processing apparatus according to one aspect of the present disclosure includes a horizontal black hat image acquiring unit that acquires horizontal black hat image data by taking a difference between source image data and horizontal closing image data obtained by performing closing processing on each pixel row of the source image data, a vertical black hat image acquiring unit that acquires vertical black hat image data by taking a difference between the source image data and vertical closing image data obtained by performing the closing processing on each pixel column of the source image data, and a logical conjunction image acquiring unit that acquires logical conjunction image data where a logical conjunction of the horizontal black hat image data and the vertical black hat image data is taken.

An image-processing method according to another aspect of the present disclosure includes a horizontal black hat image acquiring step of acquiring horizontal black hat image data by taking a difference between source image data and horizontal closing image data obtained by performing closing processing on each pixel row of the source image data, a vertical black hat image acquiring step of acquiring vertical black hat image data by taking a difference between the source image data and vertical closing image data obtained by performing closing processing on each pixel column of the source image data, and a logical conjunction image acquiring step of acquiring logical conjunction image data where a logical conjunction of the horizontal black hat image data and the vertical black hat image data is taken.

A computer program product according to still another aspect of the present disclosure is a computer program product having a non-transitory tangible computer readable medium including programmed instructions for causing, when executed by a computer, the computer to perform an image-processing method including a horizontal black hat image acquiring step of acquiring horizontal black hat image data by taking a difference between source image data and horizontal closing image data obtained by performing closing processing on each pixel row of the source image data, a vertical black hat image acquiring step of acquiring vertical black hat image data by taking a difference between the source image data and vertical closing image data obtained by performing the closing processing on each pixel column of the source image data, and a logical conjunction image acquiring step of acquiring logical conjunction image data where a logical conjunction of the horizontal black hat image data and the vertical black hat image data is taken.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An image-processing apparatus, an image-processing method, and a computer program product according to the present disclosure will be described in detail below with reference to drawings. Note that the present disclosure is not limited to this embodiment.

Configuration of the Embodiment

An example of the configuration of an image-processing apparatus 100 according to an embodiment of the present disclosure will be described below with reference to FIGS.

Figure 1:
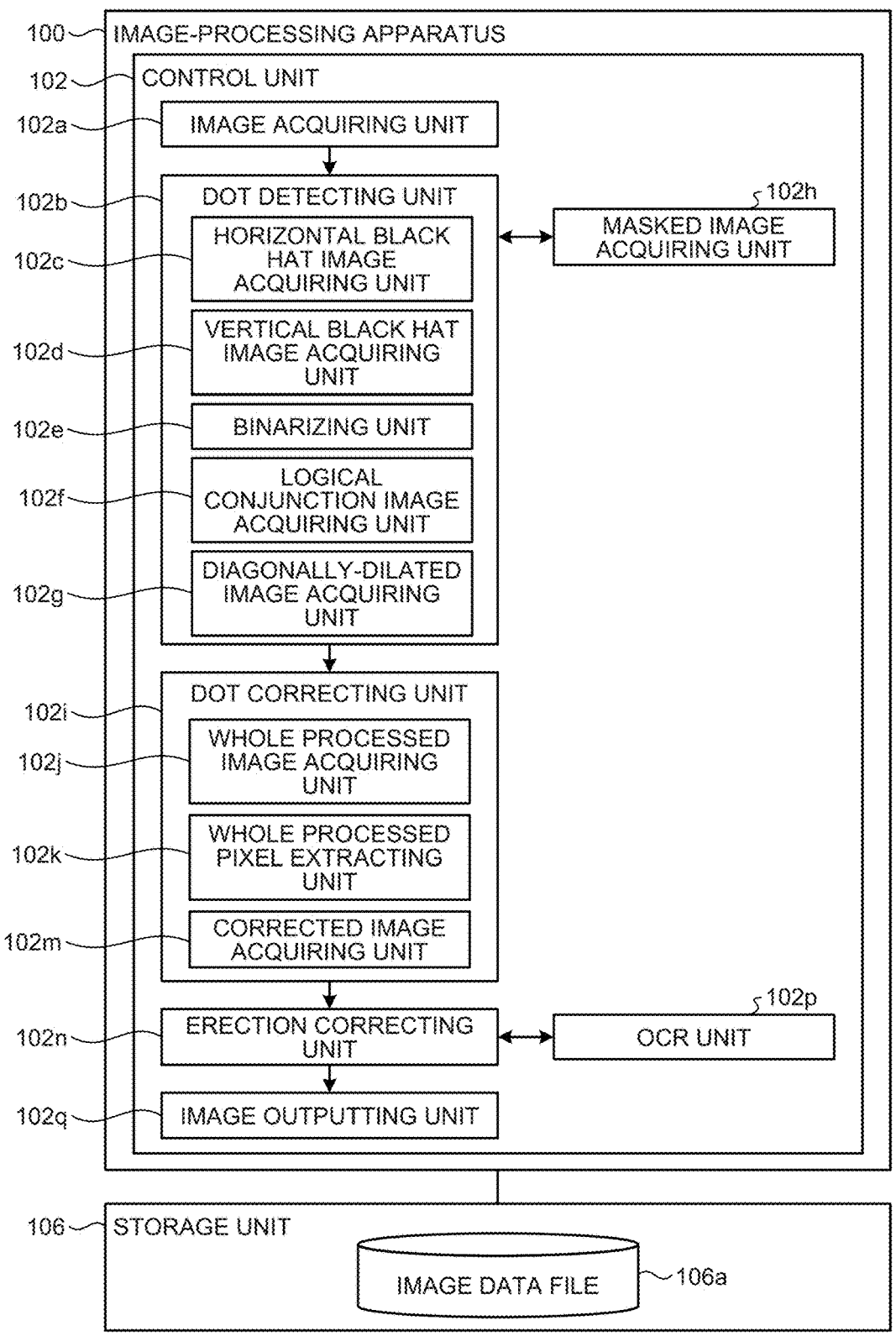
FIG. 1 is a functional block diagram of an example of a configuration of an image-processing apparatus according to an embodiment.

1 and 2, and then, processing etc. according to the embodiment will be described in detail. FIG. 1 is a functional block diagram of the example of the configuration of the image-processing apparatus 100 according to the embodiment.

In the embodiment described below, the image-processing apparatus 100 will be described as an example in order to specify the technical idea of the present disclosure. It is not intended to limit the present disclosure to the image-processing apparatus 100, and the present disclosure is applicable equally to image-processing apparatuses 100 of other embodiments included in the scope of the claims.

Function distribution of the image-processing apparatus 100 described as an example in the embodiment is not limited to the configuration described later. The image-processing apparatus 100 can be configured in such a manner that any units are functionally or physically separated or integrated, as long as similar advantageous effects and functions can be exhibited.

The image-processing apparatus 100 includes, as schematically illustrated in FIG. 1, a control unit 102 and a storage unit 106. These sections of the image-processing apparatus 100 are connected communicatively to each other via an optional communication path.

The image-processing apparatus 100 of the embodiment may be connected to an image-reading apparatus 200 (this section is not shown in FIG. 1). The image-processing apparatus 100 may include the image-reading apparatus 200 in its housing.

The image-reading apparatus 200 may be a document scanner of a manual insertion paper feeding system (Continuous Document Feeding (CDF) system), a document scanner of an automatic document feeding system (ADF system), a document scanner of a flatbed type, an overhead image-reading apparatus or the like.

The image-processing apparatus 100 may further include an input/output unit 112 (this section is not shown in FIG. 1). The input/output unit 112 performs input/output (I/O) of data.

The input/output unit 112 may be any one, some or all of a key input unit, a touch panel, a control pad (a touch pad, a game pad or the like), a mouse, a keyboard, and a microphone, for example.

The input/output unit 112 may be any one or both of a display unit (a display, a monitor, a touch panel made of crystal liquid or organic EL or the like) configured to display information such as an application, and a sound output unit (a speaker or the like) configured to output sound information as sound.

The image-processing apparatus 100 may further include an interface unit 108. The image-processing apparatus 100 may be connected intercommunicatively to an external apparatus (for example, image-reading apparatus 200 or the like) via the interface unit 108.

The interface unit 108 may be any one or both of an antenna to be connected to any one or both of a communication line and a telephone line, and an interface (NIC or the like) to be connected to a communication apparatus such as a router. Moreover, it may be a communication interface that performs a communication control between the image-processing apparatus 100 and a network.

The network may include remote communications or the like such as any one or both of wire communications and wireless communications (WiFi or the like). The interface unit 108 may be an input/output interface that performs input/output control between the image-reading apparatus 200 or the like and the control unit 102.

The control unit 102 may control the interface unit 108 and the input/output unit 112.

The storage unit 106 stores any one, some, or all of various kinds of database, tables, and files (image data file 106a and the like). Moreover, the storage unit 106 may store various kinds of application programs (for example, user applications and the like).

The storage unit 106 is a storage unit that may be any one, some, or all of a memory such as a random access memory (RAM) or a read-only memory (ROM), a fixed disc device such as a hard disc, a solid state drive (SSD), a flexible disc, and an optical disc, for example. The storage unit 106 may store computer programs and the like for giving instructions to a central processing unit (CPU) and to perform various processes.

Among these constituent elements of the storage unit 106, the image data file 106a stores image data. The image data may be data read by the image-reading apparatus 200.

The image data may be document image data (source image data), horizontal closing image data, horizontal black hat image data, vertical closing image data, vertical black hat image data, logical conjunction image data, diagonally-dilated image data, masked image data, whole processed image data, corrected image data, binarized horizontal black hat image data, binarized vertical black hat image data, erection corrected image data, and the like.

The control unit 102 may be constituted of tangible controllers that controls generally the image-processing apparatus 100, including any one, some, or all of CPU, a graphics processing unit (GPU), a digital signal processor (DSP), a large scale integration (LSI), an application specific integrated circuit (ASIC), a field-programming gate array (FPGA) and the like.

The control unit 102 has an internal memory for storing a control program, a program that regulates various procedures or the like, and required data, and it performs information processing for executing various processes based on these programs.

In particular, the control unit 102 is capable of executing various information processes based on a program relating to a morphological operation. The morphological operation is a calculation method used to change the shape of an image such as a binary image and to extract the image.

The morphological operation includes "dilation processing" and "erosion processing" as basic processes so as to implement various calculations with combinations thereof. Furthermore, the morphological operation defines an "adjacency" on a certain pixel of interest like a filter shape with a "structuring element".

The structuring element is an element that defines an adjacent pixel. For example, the structuring element may be a rectangular pixel group including 3×3=9 pixels centered on the pixel of interest.

In the dilation processing, when there is a white pixel in the vicinity of a black pixel, the black pixel is changed to a white pixel. In other words, in the dilation processing, the white pixel is dilated literally. The dilation processing may be rephrased as processing of taking a maximal value among the adjacent pixels, including multivalent image data.

In the erosion processing, when there is a black pixel in the vicinity of a white pixel, the white pixel is changed to a black pixel. In other words, in the erosion processing, the white pixel is eroded literally. The erosion processing may be rephrased as processing of taking a minimal value among the adjacent pixels, including multivalent image data.

Closing processing as another morphological operation is processing of performing erosion after dilation. In other words, the closing processing is processing of eliminating fine shapes.

In particular, the closing processing is capable of erasing effectively areas of black noise or the like scattered in a white area. In addition, in a case of a multivalent image, the closing processing is capable of erasing a small and dark area present in a bright area.

Further, opening processing as another morphological operation is processing of performing dilation after erosion. In other words, the opening processing is reverse to the closing processing.

The opening processing is capable of erasing effectively areas like white noise (isolated points or the like) remaining scattered in a black area. Further, in a case of a multivalent image, the opening processing is capable of erasing a small and bright area present in a dark area.

Black hat processing as another morphological operation is processing of subtracting a closing image from a source image. In other words, the black hat processing is capable of extracting the small and dark area that has been erased from the bright area by the closing processing.

The control unit 102 includes an image acquiring unit 102a, a dot detecting unit 102b, a masked image acquiring unit 102h, a dot correcting unit 102i, an erection correcting unit 102n, an OCR unit 102p, and an image outputting unit 102q, as principal constituent elements.

The image acquiring unit 102a acquires image data. The image acquiring unit 102a may acquire source image data read by the image-reading apparatus 200. Furthermore, the image acquiring unit 102a may store the image data in the image data file 106a.

The dot detecting unit 102b detects a dot area that expresses a dot character from the source image data. The dot detecting unit 102b includes at least a horizontal black hat image acquiring unit 102c, a vertical black hat image acquiring unit 102d, a binarizing unit 102e, a logical conjunction image acquiring unit 102f, and a diagonally-dilated image acquiring unit 102g.

The dot characters (dot printed characters) are used frequently for printing in a delivery order (carbon paper) or the like to be copied, printing in a time card, a passbook or the like to be used many times over a long time, and a receipt or the like for which running costs and storage stability are emphasized.

The horizontal black hat image acquiring unit 102c acquires horizontal black hat image data by taking a difference between the source image data and the horizontal closing image data obtained by performing closing processing on each pixel row of the source image data.

The vertical black hat image acquiring unit 102d acquires vertical black hat image data by taking a difference between the source image data and vertical closing image data obtained by performing the closing processing on each pixel column of the source image data.

The binarizing unit 102e acquires (converts to) binarized image data by performing binarization processing on the image data.

The binarizing unit 102e may acquire binarized horizontal black hat image data and binarized vertical black hat image data by performing binarization processing on the horizontal black hat image data and the vertical black hat image data based on a predetermined threshold.

The predetermined threshold may be a value having a gradation difference of 20 steps or more from a background pixel. Further, the predetermined threshold may be a value set by binarization with Otsu's method.

The logical conjunction image acquiring unit 102f acquires logical conjunction image data where a logical conjunction of two different image data is taken. The logical conjunction image acquiring unit 102f may acquire logical conjunction image data where a logical conjunction of the horizontal black hat image data and the vertical black hat image data is taken.

The logical conjunction image acquiring unit 102f may acquire logical conjunction image data where a logical conjunction of the binarized horizontal black hat image data and the binarized vertical black hat image data is taken.

The diagonally-dilated image acquiring unit 102g acquires diagonally-dilated image data by performing dilation processing on each diagonal pixel group that is diagonal with respect to either the pixel row or the pixel column of the image data.

The diagonally-dilated image acquiring unit 102g may acquire diagonally-dilated image data by performing dilation processing on each diagonal pixel group that is diagonal with respect to either the pixel row or the pixel column of the logical conjunction image data. The diagonal direction may be a direction of ±45°.

In this manner, the dot detecting unit 102b may execute dot detection processing for extracting only the dot area by use of processing to erase only the dot area in order to limit the object of the correction processing to the dot (area).

The masked image acquiring unit 102h acquires masked image data by performing dilation processing on each pixel row and each pixel column of the diagonally-dilated image data.

The dot correcting unit 102i performs correction on the dot area. The dot correcting unit 102i includes a whole processed image acquiring unit 102j, a whole processed pixel extracting unit 102k, and a corrected image acquiring unit 102m.

The whole processed image acquiring unit 102j acquires whole processed image data by performing erosion processing on the whole of the source image data.

The whole processed image acquiring unit 102j may acquire whole processed image data by performing erosion processing and then further performing dilation processing on the whole of the source image data.

The whole processed pixel extracting unit 102k extracts a whole processed pixel included in the whole processed image data and corresponding to a position of a dot area pixel included in either the logical conjunction image data or the masked image data.

The corrected image acquiring unit 102m acquires corrected image data where the document pixel (source pixel) corresponding to the position of the dot area pixel included in the source image data has been replaced by the whole processed pixel.

In this manner, the dot correcting unit 102i may execute dot correction processing of performing correction of connection and thickness of the dot (area pixel) by using the result of the dot detection processing, without imposing influence on areas other than the dot (area).

The erection correcting unit 102n acquires erection corrected image data by performing erection correction processing on the image data. The erection correcting unit 102n may acquire the erection corrected image data by performing erection correction processing on the corrected image data.

The erection correcting unit 102n may store the erection corrected image data in the image data file 106a.

The OCR unit 102p performs optical character recognition (OCR) processing on the image data, thereby acquiring character data. The OCR unit 102p may perform OCR processing on either the corrected image data or the erection corrected image data, thereby acquiring the character data.

Further, the OCR unit 102p may store the character data in the image data file 106a.

The image outputting unit 102q causes the image data to be outputted. The image outputting unit 102q may cause the image data to be outputted via the input/output unit 112.

Figure 2:
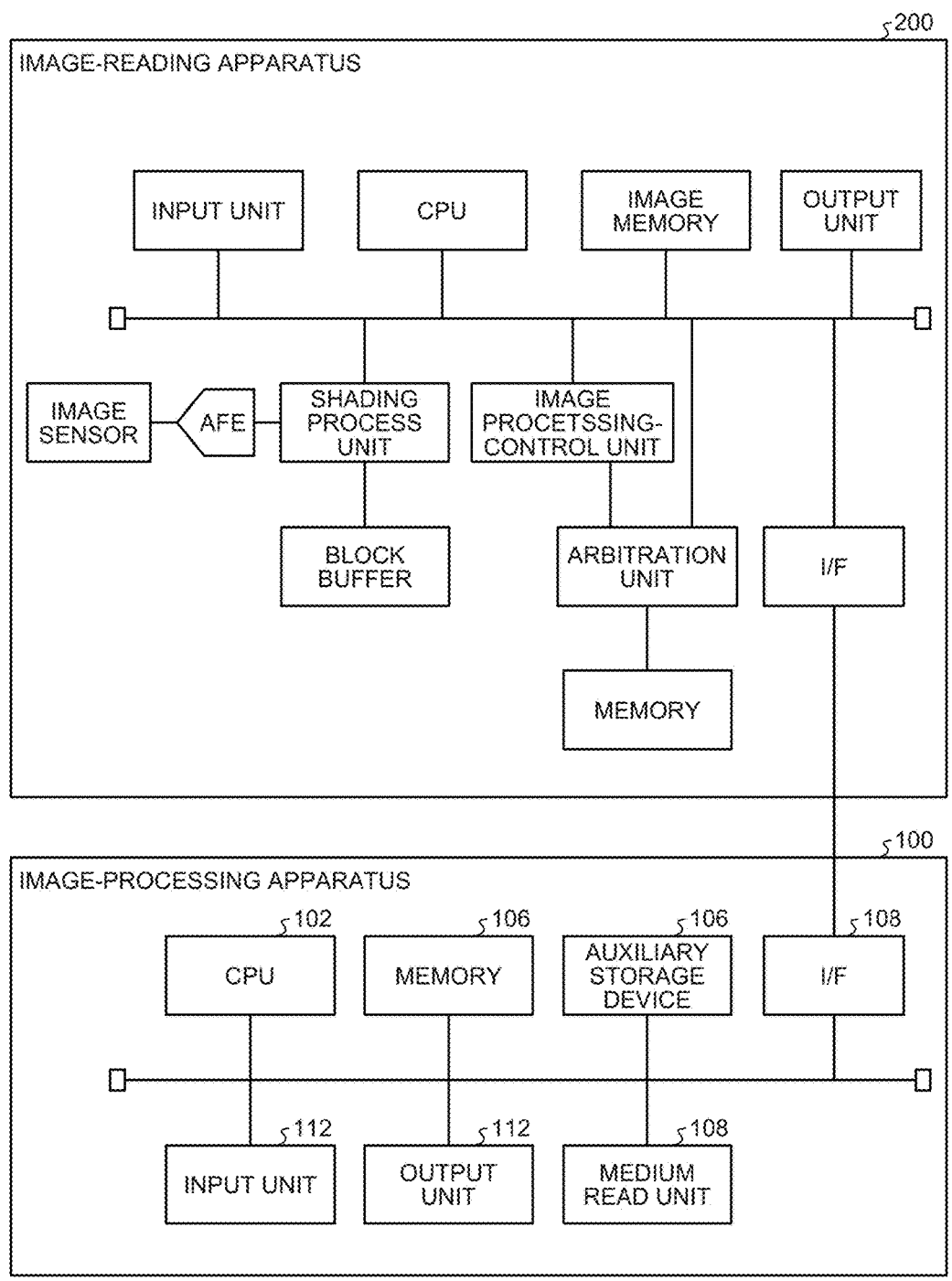
FIG. 2 is a block diagram of an example of a hardware configuration of an image-processing apparatus according to the embodiment.

Furthermore, an example of hardware configuration of the image-processing apparatus 100 according to the embodiment will be explained with reference to FIG. 2. FIG. 2 is a block diagram of an example of a hardware configuration of the image-processing apparatus 100 according to the embodiment.

As illustrated in FIG. 2, the image-processing apparatus 100 may be connected communicatively to the image-reading apparatus 200 via the interface unit (I/F) 108.

As illustrated in FIG. 2, the image-processing apparatus 100 may include a CPU 102 that generally controls the image-processing apparatus 100, the memory 106 and an auxiliary storage device 106 as storage units.

Further, as illustrated in FIG. 2, the image-processing apparatus 100 may include, for example, an I/F 108 that controls communicative connection to the image-reading apparatus 200, an interface unit (medium read unit) 108 such as a USB port for connecting a recording medium or the like, an input unit 112 for performing data input, and an output unit 112 for performing data output.

Further, as illustrated in FIG. 2, the image-reading apparatus 200 may include a CPU that generally controls the image-reading apparatus 200, a block buffer, a memory and an image memory as storage units, and an arbitration unit that arbitrates an access request to the memory.

Further as illustrated in FIG. 2, the image-reading apparatus 200 may include an image sensor that performs image reading, an analog front end (AFE) as an analog circuit that connects the image sensor and a shading process unit, and a shading process unit that adjusts shades of the image data.

Further, as illustrated in FIG. 2, the image-reading apparatus 200 may include, for example, an image-processing-control unit that controls image processing on the read image data, an I/F (interface unit) that controls communicative connection to the image-processing apparatus 100, an input unit for performing data input, and an output unit for performing data output.

Processing of the Embodiment

Figure 3:
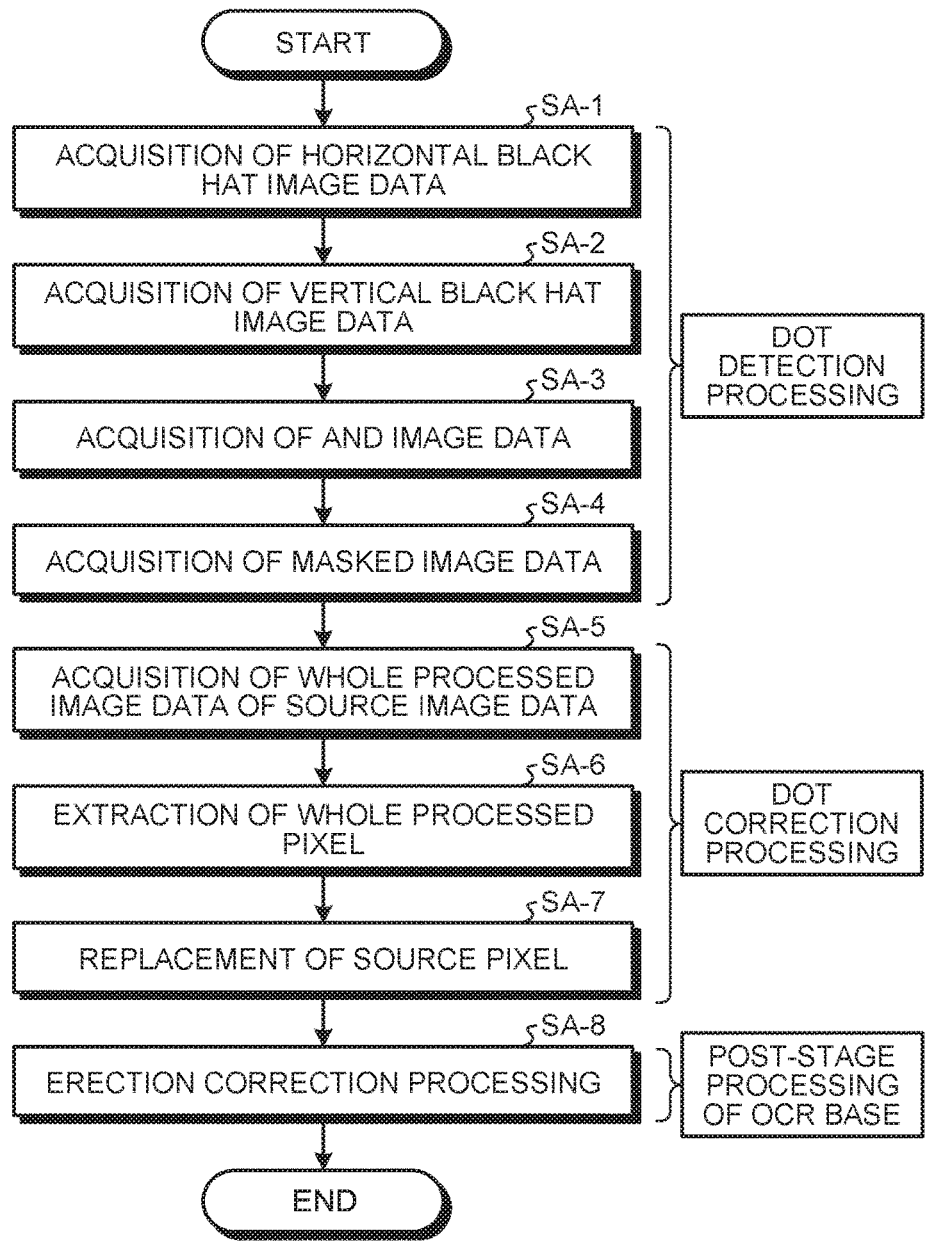
FIG. 3 is a flow chart of an example of processing in an image-processing apparatus of the embodiment.
Figure 4:
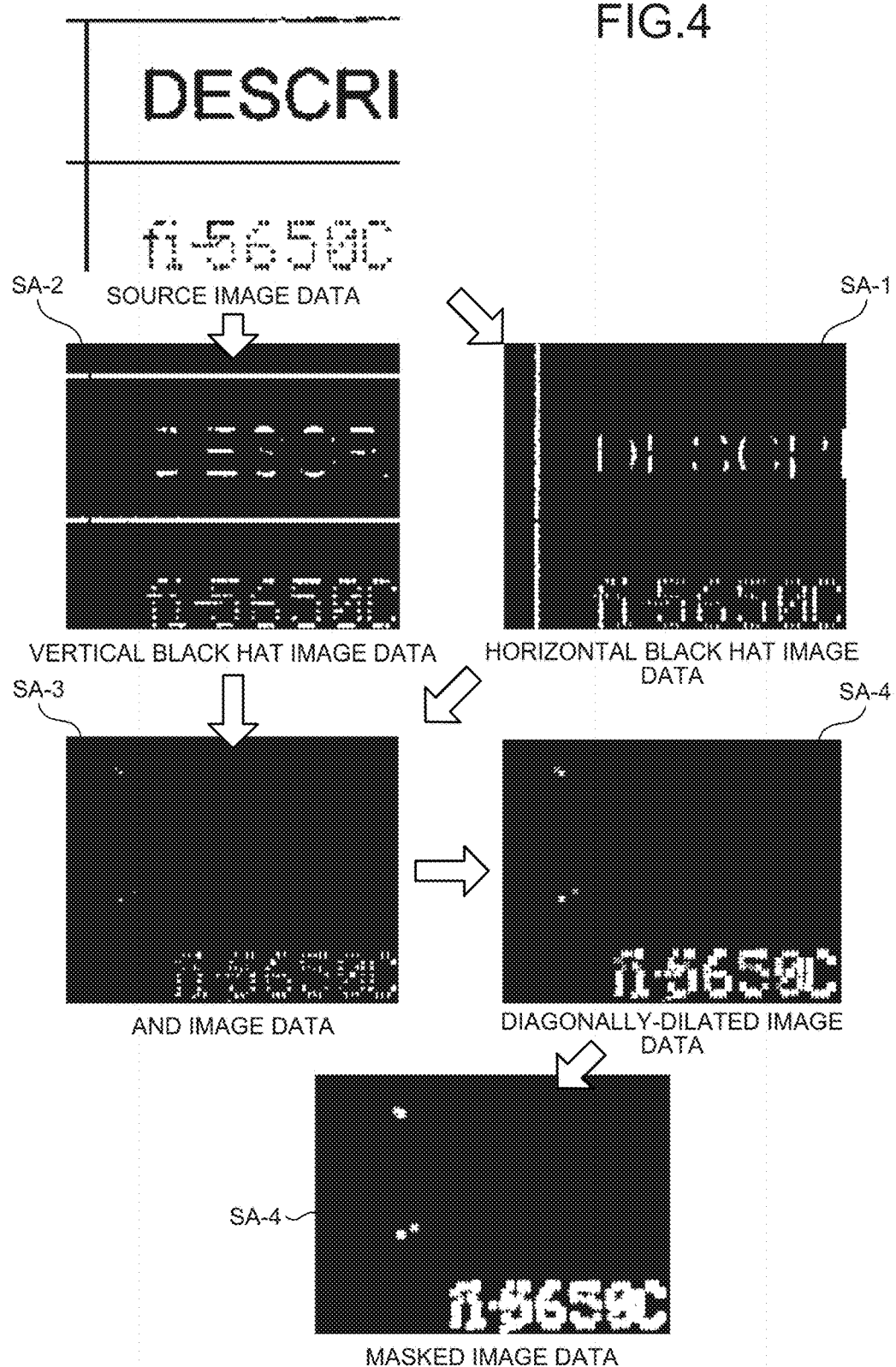
FIG. 4 is a flow diagram of an example of dot detection processing of the embodiment.
Figure 5:
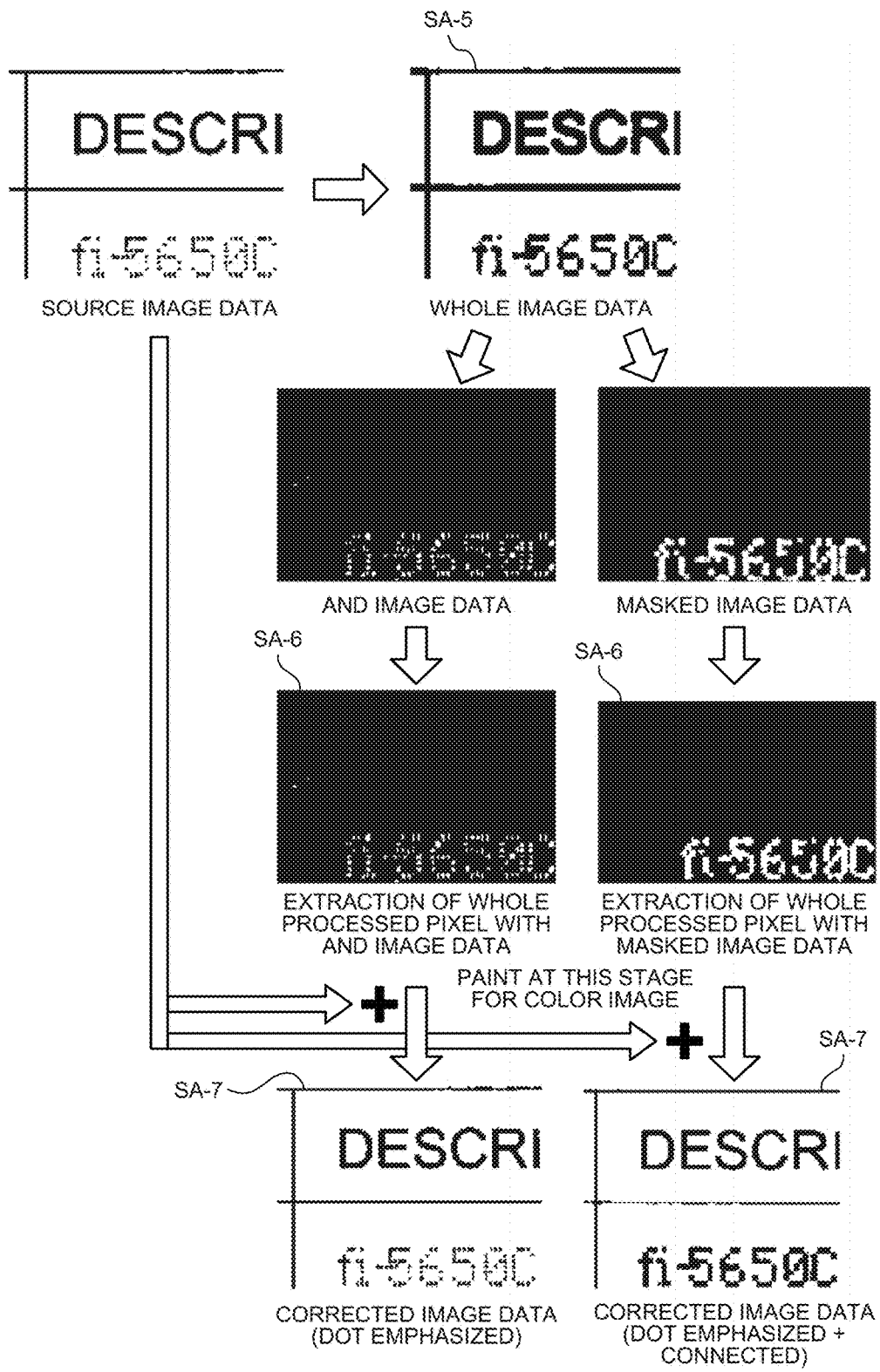
FIG. 5 is a flow diagram of an example of dot correction processing of the embodiment.

An example of processing executed in the image-processing apparatus 100 having the above-described configuration will be explained with reference to FIG. 3 to FIG. 7. FIG. 3 is a flowchart of an example of processing in the image-processing apparatus 100 of the embodiment. FIG. 4 is a flow diagram of an example of dot detection processing of the embodiment. FIG. 5 is s flow diagram of an example of dot correction processing of the embodiment.

As illustrated in FIG. 3, first, the horizontal black hat image acquiring unit 102c acquires horizontal black hat image data by taking a difference between document image data (source image data) read by the image-reading apparatus 200 and horizontal closing image data obtained by performing closing processing by using, as a structuring element, N pixel(s) of N×1 (N: natural number) centered on a pixel of interest in each pixel row of the source image data (Step SA-1).

Specifically, as illustrated in FIG. 4, the horizontal black hat image acquiring unit 102c may execute the black hat processing by setting the structuring element as a horizontal straight line, thereby extracting a pixel that has no continuity in the horizontal direction and that is darker than the base color of the source image data.

Namely, the horizontal black hat image acquiring unit 102c may extract pixels corresponding to the dot, a vertical ruled line, and a vertical line part or the like of the character.

Returning to FIG. 3, the vertical black hat image acquiring unit 102d acquires vertical black hat image data by taking a difference between the source image data and the vertical closing image data obtained by performing closing processing by using, as structuring element, N pixel(s) of 1×N centered on a pixel of interest in each pixel column of the source image data (Step SA-2).

Specifically, as illustrated in FIG. 4, the vertical black hat image acquiring unit 102d may execute the black hat processing by setting the structuring element as a vertical straight line, thereby extracting a pixel that has no continuity in the vertical direction and that is darker than the base color of the source image data.

Namely, the vertical black hat image acquiring unit 102d may extract pixels corresponding to the dot, a horizontal ruled line and a horizontal line part or the like of the character.

Returning to FIG. 3, the logical conjunction image acquiring unit 102f acquires logical conjunction image data (vertical and horizontal AND image data) where a logical conjunction of the horizontal black hat image data and the vertical black hat image data is taken (Step SA-3).

Specifically, as illustrated in FIG. 4, the logical conjunction image acquiring unit 102f may take a logical conjunction (AND) of the results of Step SA-1 and Step SA-2.

The pixel that is erased equally in closing processing in both of the vertical and horizontal directions (namely, extracted by the black hat processing) is limited to a dot area pixel, and thus, extraction of a pixel included in the results for both directions indicates extraction of a dot area pixel.

Further in the embodiment, when the source image data are multivalent image data, the logical conjunction image acquiring unit 102f may extract, based on a predetermined threshold, any pixel equal to or more than the threshold in the horizontal black hat image data and the vertical black hat image data, as a binary dot area pixel.

Returning to FIG. 3, the diagonally-dilated image acquiring unit 102g acquires diagonally-dilated image data by performing dilation processing on each diagonal pixel group that is diagonal by ±45° with respect to either a pixel row or a pixel column of the AND image data. The masked image acquiring unit 102h acquires masked image data by performing dilation processing on each pixel row and each pixel column of the diagonally-dilated image data (Step SA-4).

Specifically, as illustrated in FIG. 4, the diagonally-dilated image acquiring unit 102g may expand (dilate) in a diagonal direction the AND image data (data where the dot area pixel has been extracted).

Here, the dot areas expressing a dot character are not connected at all in the diagonal direction and the dot area pixels are disconnected from each other. For complementing this, the diagonally-dilated image acquiring unit 102g may perform dilation processing in a diagonal direction (in an "x" shape) on the AND image data so as to improve the connectivity in the diagonal direction of the dot area pixels.

Further as illustrated in FIG. 4, the masked image acquiring unit 102h may perform dilation processing in the vertical and horizontal directions (in a "+" shape) on the diagonally-dilated image data, thereby connecting the disconnected dot areas so as to expand further in the vertical and horizontal directions and thickening appropriately the character so as to expand the dot areas.

In the embodiment, if rectangular 3×3=9 pixels centered on the pixel of interest are set as a structuring element, too many pixels would be connected in the diagonal directions. In order to avoid this, a cross-shaped pixel group composed of each pixel row and each pixel column may be set as a structuring element.

Dot detection processing in a narrow sense is completed during the processes from Step SA-1 to Step SA-3 illustrated in FIG. 3, and the process of Step SA-4 illustrated in FIG. 3 is processing for shaping the dots to be suitable to dot correction processing.

As mentioned above, since each dot area expressing a dot character is small and has no continuity either in the vertical or the horizontal direction, thus it may be erased due to bidirectional closing processing.

On the other hand, an area expressing an element other than a dot has an area continuous in at least either the vertical or horizontal direction even for an ordinary sized character, a ruled line or the like, and thus the area may not be erased due to bidirectional closing processing.

Utilizing these properties, in the embodiment, it may be possible to discriminate a dot area, collect pixels that have been erased due to the bidirectional closing processing in the vertical and horizontal directions, and to perform correction such as dilation processing, thereby creating masked image data where only dot area pixels expressing a dot character are extracted.

Returning to FIG. 3, the whole processed image acquiring unit 102$j$ acquires whole processed image data by performing erosion processing by using, as a structuring element, 3×3=9 pixels centered on a pixel of interest in the whole of the source image data (Step SA-5).

The whole processed image acquiring unit 102$j$ may acquire the whole processed image data by performing erosion processing by using, as the structuring element, 3×3=9 pixels centered on the pixel of interest, and then by further performing dilation processing on the whole of the source image data.

Specifically, as illustrated in FIG. 5, the whole processed image acquiring unit 102$j$ may acquire whole processed image data obtained by subjecting the whole of the source image data to erosion processing at multi-values (dilation processing for dark pixels).

Thereby, as illustrated in FIG. 5, the source image becomes a whole processed image where a dark color is dilated as a whole. Regarding the shape of the structuring element and combination of dilation processing and erosion processing in the embodiment, the frequencies, the numerical values and the like may be adjusted based on the resolution and the like.

Figure 6:
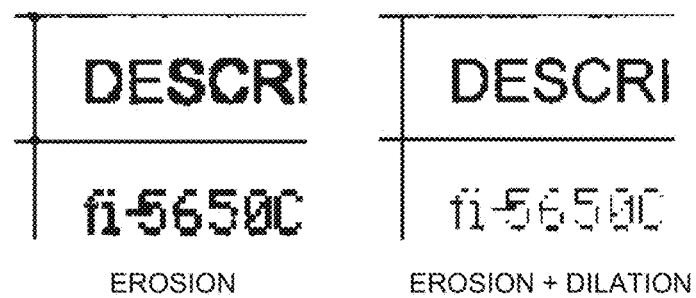
FIG. 6 is a diagram of an example of whole processed image data in the embodiment.

Here an example of whole processed image acquisition processing in the embodiment will be explained with reference to FIG. 6. FIG. 6 is a diagram of an example of whole processed image data in the embodiment.

As illustrated in the left part of FIG. 6, the whole processed image acquiring unit 102$j$ performs erosion processing on the whole of the source image data. As a result, when the dot areas become excessively thick, dilation processing is performed later (as opening processing) additively to the erosion processing as illustrated in the right part of FIG. 6 so as to provide thin linear dot areas where the connectivity between the pixels is degraded a little.

Returning to FIG. 3, the whole processed pixel extracting unit 102$k$ extracts a whole processed pixel that is included in the whole processed image data and that corresponds to a position of a dot area pixel included in either the AND image data or the masked image data (Step SA-6).

Specifically, as illustrated in FIG. 5, the whole processed pixel extracting unit 102$k$ may extract (crop) a whole processed pixel that is included in the whole processed image data and that is at the same coordinate as the position of the dot area pixel included in either the AND image data or the masked image data obtained by connecting dot areas created by the dot detection processing.

In the embodiment, the AND image data are used, so that only the colors or the contours can be emphasized without changing the connectivity and the shapes of the dot areas.

Further in the embodiment, erosion processing is performed on the whole of the source image data, so that color irregularity in the dot areas included in the source image and blurry contours (which have been boundaries between the dot characters and the base color) are filled with the color deepest in the dot areas, and thus a deep and clear color is presented.

Further in the embodiment, the AND image is obtained by capturing the original dot areas. Therefore, application of the AND image data to this dot correction processing provides an effect of making the color of the dot areas deep and uniform and clearly defining the contours of the dot areas without changing the shapes of the dot areas.

Returning to FIG. 3, the corrected image acquiring unit 102$m$ acquires corrected image data where the document pixel (source pixel) corresponding to the position of the dot area pixel included in the source image data has been replaced by the whole processed pixel (Step SA-7).

Specifically, as illustrated in FIG. 5, the corrected image acquiring unit 102$m$ replaces the pixels included in the source image data with whole processed pixels, so that it can acquire corrected image data of a corrected image where the dot areas are connected and corrected to be thicker while substantially no influence is imposed on the other normal characters, ruled line parts and the like.

Namely in the embodiment, color data included in the dot area pixels of the source image data (before subjecting the whole to multivalent erosion processing) also are replaced by color data included in the whole processed pixel (after subjecting the dot area pixels of the source image data to multivalent erosion processing).

The whole processed image data includes many pixels corresponding to the dot area pixels of deep color included in the source image data, and thus when the dot area pixels included in the source image data are replaced by the whole processed pixels (pixels corresponding to the dot position), not only the shapes but the colors can be made clear (to provide an impression as if it is painted with a deep element).

In this manner, in the embodiment, the dot area pixels expressing the dot character included in the source image data are replaced based on the masked image data and the like and at the same time replaced by any suitable dot color data, and thus, corrected image data where partly-missing dot area pixels are connected can be acquired.

In this manner, in the embodiment, it is possible to acquire image data of a corrected image in which the dots are connected to make thick lines of character that can be easily recognized by human eyes and also by a machine.

Further in the embodiment, data processing like previous clipping of a dot area from the document image is not necessary, and thus procedures and time required for the processing can be reduced.

Returning to FIG. 3, the erection correcting unit 102n acquires erection corrected image data by performing erection correction processing on the corrected image data. The OCR unit 102p acquires character data by performing OCR processing on the erection corrected image data (Step SA-8), and then the processing is ended.

In this manner, in the embodiment, existing recognition processing is performed by applying the dot correction processing as preprocessing, and thus, it is possible to acquire further accurate character data based on the dot parts and to perform precise recognition processing.

In many cases, the erection correction processing is performed to extract image data by the character unit so as to decide the direction of the character. The dot character can be decided easily by human eyes, but in general, it tends to be recognized as a character with an inferior precision when processed with a machine.

For solving this problem, the dot detection processing and the dot correction processing (dot detection correction processing) as preprocessing in the embodiment are combined with the erection correction processing, thereby improving the determination precision of the erection correction processing.

In particular, for a document image including only dot characters, erection correction processing on the source image data without the preprocessing (dot detection correction processing) may often fail, although it depends on the determination precision of the character-recognition engine.

On the other hand, a combination with the dot detection correction processing raises the character recognition precision, thereby improving the determination precision of the erection correction processing. The dot detection correction processing may be effective in combination with not only the erection correction processing but various types of processing such as OCR processing, binarization processing or form identification processing where character recognition or character shape is the key factor.

Figure 7:
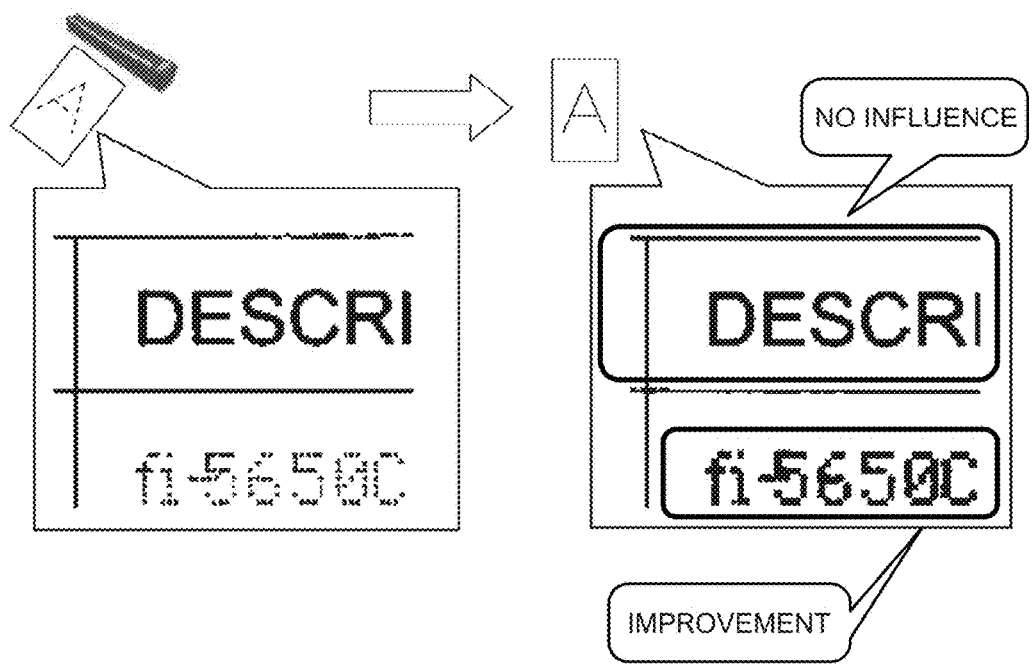
FIG. 7 is a diagram of an example of dot detection correction processing in the embodiment.

With reference to FIG. 7, an example of the dot detection correction processing in the embodiment is explained. FIG. 7 is a diagram of an example of dot detection correction processing in the embodiment.

As illustrated in FIG. 7, in the embodiment, the source image data read by the image-reading apparatus 200 are corrected to image data of a corrected image where only the character areas of the dot printed characters are connected to be thickened, thereby improving the visibility of the dot printed characters.

In the embodiment, when the document image is a color image where both the base color and the dots have chromatic colors (for example, the base is light blue and the dots are violet), the black hat image data are obtained as color image data. When the black hat image data are converted to masked image data, a predetermined threshold may be set to create the masked image data.

The predetermined threshold is not limited in particular as long as the gradation difference enables visual discrimination between the irregularity of the base color and the dot characters. Any particularly large gradation difference is not required.

For example, in any of RGB, since variation in the range of about 10-steps gradation can be the irregularity in the document base color, the predetermined threshold may include gradations of 20-steps or more.

In this case, the vertical and horizontal black hat image data are acquired as color image data. Therefore, at the time of creating masked image data, binarization processing may be performed by applying a threshold of about 20-step gradation to prevent false detection of irregularities or the like in the document.

The threshold for binarization processing may be set automatically by combining with a technique such as "binarization with Otsu's method" for dynamically deciding a threshold.

In the embodiment, when the black pixels that have not been changed are erased, pixels derived from the dots and the pixels derived from the base color may be distributed unevenly, and thus the threshold can be set automatically.

There have been many types of processing that applies character data as input data, such as erection correction processing and OCR processing. In such processing, capability of reading clearly is required so that a character is recognized as it is.

However, even if a document including characters printed in dots is read clearly, the characters are not more than an aggregate of dots unsuitable for recognition processing. As a result, in determination processing, the precision may often deteriorate considerably.

Moreover, when a human watches scanned image data, the dot characters may be unfavorable in legibility because they tend to be disconnected, thin and faint.

In a conventional technique of thickening the characters of the whole document, the ruled lines and noise also would be thickened to degrade the legibility and cause discrepancy from the source document.

Examples of images with inferior legibility include disconnected images or blurred images including characters printed with a dot impact printer. Examples of processing for correcting these images include shading (smoothing, anti-aliasing, and the like) processing, dilation processing, and erosion processing.

However, the processing according to the conventional techniques has some disadvantage, namely, it affects the whole image to cause blurs and deformation of non-dotted characters.

Meanwhile in the conventional technique, image area separation processing (processing of separating areas according to classification like characters, pictures and the like) is carried out for avoiding influences on the whole image.

However, in the image area separation processing, continuity of a line is checked for distinguishing characters, and thus, it is difficult to apply this processing to dot characters that do not have continuity.

Furthermore, it is difficult to apply the image area separation processing to dot characters, because there is a tendency that the dot characters become faint or seem like being crushed in the preprocessing (noise removal).

In light of these situations, in the embodiment, the dots composing a dot character are connected so that the character consisting of a group of dots is corrected to form a line, thereby improving the legibility. In particular, in the embodiment, the dot groups are connected in a diagonal direction so as to improve the legibility.

Further in the embodiment, the dot characters are thickened to solve the problem of illegibility caused by mixture of the base color of the document into the space between the thin dots.

Further in the embodiment, the correction does not impose influence on the contents other than the dot characters. Therefore, even after the dot correction, the other contents will be prevented from being excessively blurred (crushed) or thickened.

Thereby in the embodiment, the dot characters are chosen by the processing of extracting only the dots and corrected to acquire image data where legibility of characters is improved and an adverse effect is suppressed.

That is, in the dot detection processing according to the embodiment, the image data of a masked image in which only the dots are extracted and the extracted dots are corrected to be connected to each other are created as a detection result.

Further in the dot correction processing of the embodiment, dilation processing is performed uniformly on the source image data and then pixel replacement is performed based on the masked image data so as to obtain corrected image data.

Further in the embodiment, the dot detection correction processing is used as preprocessing for other determination processing such as erection correction processing, thereby enabling improvement in determination precision in the erection correction processing or the like.

That is, the dot detection correction processing of the embodiment is effective in improving legibility when the characters are observed with human eyes. Moreover, this processing performed as preprocessing for any mechanical processing such as erection correction processing or OCR processing enables recognition of characters of source image data that are substantially unrecognizable by a conventional technique.

Other Embodiments

The embodiment of the present disclosure has been explained so far. Besides the foregoing embodiment, the present disclosure can also be carried out in various different embodiments within the scope of the technical idea described in the claims.

For example, the image-processing apparatus 100 may perform processing in a standalone mode, or may perform processing according to a request from a client terminal (separate from the image-processing apparatus 100) and then return the results of the processing to the client terminal.

Out of the processes explained in relation to the embodiment, all or some of the processes explained as being automatically performed may be manually performed, or all or some of the processes explained as being manually performed may be automatically performed by publicly known methods.

Besides, the process steps, the control steps, the specific names, the information including registered data for the processes or parameters such as search conditions, the screen examples, or the database configurations described or illustrated herein or the drawings can be appropriately changed if not otherwise specified.

The constituent elements of the image-processing apparatus 100 shown in the drawings are conceptual functions and do not necessarily need to be physically configured as shown in the drawings.

For example, all or any part of the processing functions included in the units of the image-processing apparatus 100, in particular, the processing functions performed by the control unit 102 may be implemented by the CPU or programs interpreted and executed by the CPU, or may be implemented by wired logic-based hardware.

The programs including programmed instructions for causing a computer to execute methods according to the present disclosure described later are recorded in non-transitory computer-readable recording media, and are mechanically read by the image-processing apparatus 100 as necessary. Specifically, the computer programs for giving instructions to the CPU to perform various processes in cooperation with an operating system (OS) are recorded in the storage unit 106 such as a ROM or an HDD. The computer programs are loaded into the RAM and executed, and constitute a control unit in cooperation with the CPU.

The computer programs may be stored in an application program server connected to the image-processing apparatus 100 via an appropriate network, and may be entirely or partly downloaded as necessary.

The programs according to the present disclosure may be stored in computer-readable recording media or may be formed as program products. The "recording media" include any portable physical media such as a memory card, a USB memory, an SD card, a flexible disc, a magneto optical disc (MO), a ROM, an erasable programmable read only memory (EPROM), an electrically erasable programmable read only memory (EEPROM), a compact disc read only memory (CD-ROM), a DVD, and a Blu-ray (registered trademark) disc.

The "programs" constitute data processing methods described in an appropriate language or by an appropriate describing method, and are not limited in format such as source code or binary code. The "programs" are not limited to singly-configured ones but may be distributed into a plurality of modules or libraries or may perform their functions in conjunction with another program typified by an OS. Specific configurations for reading the recording media by the units according to the embodiment, specific procedures for reading the programs, or specific procedures for installing the read programs may be well-known configurations or procedures.

The various databases and others stored in the storage unit 106 may be storage units such as any one, some, or all of a memory device such as a RAM or a ROM, a fixed disc device such as a hard disc, a flexible disc, and an optical disc, and may store any one, some, or all of various programs, tables, databases, and web page files for use in various processes and web site provision.

The image-processing apparatus 100 may be an information processing apparatus such as a well-known personal computer, and an appropriate peripherals may be connected to the information processing apparatus. The image-processing apparatus 100 may be embodied by providing the information processing apparatus with software (including programs, data, and the like) for implementing the methods according to the present disclosure.

Further, the specific modes of distribution and integration of the devices are not limited to the ones illustrated in the drawings but all or some of the devices may be functionally or physically distributed or integrated by a predetermined unit according to various additions and the like or functional loads. That is, the foregoing embodiments may be carried out in any appropriate combination or may be selectively carried out.

The present disclosure makes it possible to perform a morphological operation and perform correction processing on not only a binary image but a multivalent image by using a linear pixel groups as a structuring element that constitute the image.

According to the present disclosure, influence of correction on constituent elements except dot characters can be prevented by extracting dots appropriately.

Although the invention has been described on specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer comprising:
a memory; and
a processor coupled to the memory, wherein
the processor executes a process comprising:
acquiring horizontal black hat image data by taking a difference between source image data and horizontal closing image data obtained by performing closing processing on each pixel row of the source image data;
acquiring vertical black hat image data by taking a difference between the source image data and vertical closing image data obtained by performing the closing processing on each pixel column of the source image data;
acquiring logical conjunction image data where a logical conjunction of the horizontal black hat image data and the vertical black hat image data is taken; and
performing dilation processing in a diagonal direction with respect to either a pixel row or a pixel column of the logical conjunction image data and/or in vertical and horizontal directions with respect to either the pixel row or the pixel column of the logical conjunction image data.

2. The computer according to claim 1, wherein
the process further comprises:
acquiring diagonally-dilated image data by performing the dilation processing in the diagonal direction; and
acquiring masked image data by performing the dilation processing on each pixel row and each pixel column of the diagonally-dilated image data.

3. The computer according to claim 2, wherein
the process further comprises:
acquiring whole processed image data by performing erosion processing on the whole of the source image data;
extracting a whole processed pixel included in the whole processed image data and corresponding to a position of a dot area pixel included in either the logical conjunction image data or the masked image data; and
acquiring corrected image data where a source pixel corresponding to the position included in the source image data is replaced by the whole processed pixel.

4. The computer according to claim 3, wherein
the acquiring the whole processed image data includes acquiring the whole processed image data by performing the erosion processing and further performing the dilation processing on the whole of the source image data.

5. The computer according to claim 3, wherein
the process further comprises acquiring erection corrected image data by performing erection correction processing on the corrected image data.

6. The computer according to claim 5, wherein
the process further comprises performing OCR processing on either the corrected image data or the erection corrected image data so as to acquire character data.

7. The computer according to claim 1, wherein
the process further comprises acquiring binarized horizontal black hat image data and binarized vertical black hat image data by performing binarization processing on the horizontal black hat image data and the vertical black hat image data, based on a predetermined threshold, and
the acquiring logical conjunction image data includes acquiring the logical conjunction image data where a logical conjunction of the binarized horizontal black hat image data and the binarized vertical black hat image data is taken.

8. The computer according to claim 7, wherein
the predetermined threshold is a value having a gradation difference of 20 steps or more from a background pixel.

9. The computer according to claim 7, wherein
the predetermined threshold is a value set by binarization with Otsu's method.

10. The computer according to claim 1, wherein
the diagonal direction is a direction of ±45°.

11. An image-processing method in a computer, the image-processing method comprising:
acquiring horizontal black hat image data by taking a difference between source image data and horizontal closing image data obtained by performing closing processing on each pixel row of the source image data;
acquiring vertical black hat image data by taking a difference between the source image data and vertical closing image data obtained by performing closing processing on each pixel column of the source image data;
acquiring logical conjunction image data where a logical conjunction of the horizontal black hat image data and the vertical black hat image data is taken; and
performing dilation processing in a diagonal direction with respect to either a pixel row or a pixel column of the logical conjunction image data and/or in vertical and horizontal directions with respect to either the pixel row or the pixel column of the logical conjunction image data.

12. The image-processing method according to claim 11, further comprising:
acquiring diagonally-dilated image data by performing the dilation processing in the diagonal direction; and
acquiring masked image data by performing the dilation processing on each pixel row and each pixel column of the diagonally-dilated image data.

13. The image-processing method according to claim 12, further comprising:
acquiring whole processed image data by performing erosion processing on the whole of the source image data;
extracting a whole processed pixel included in the whole processed image data and corresponding to a position of a dot area pixel included in either the logical conjunction image data or the masked image data; and
acquiring corrected image data where a source pixel corresponding to the position included in the source image data is replaced by the whole processed pixel.

14. The image-processing method according to claim 13, wherein
the acquiring the whole processed image data includes performing the erosion processing and further performing the dilation processing on the whole of the source image data so as to acquire the whole processed image data.

15. The image-processing method according to claim 13, further comprising:

acquiring erection corrected image data by performing erection correcting processing on the corrected image data.

16. The image-processing method according to claim 11, further comprising:
acquiring binarized horizontal black hat image data and binarized vertical black hat image by performing a binarization processing on the horizontal black hat image data and the vertical black hat image data based on a predetermined threshold, wherein
the acquiring logical conjunction image data includes acquiring the logical conjunction image data where a logical conjunction of the binarized horizontal black hat image data and the binarized vertical black hat image data is taken are acquired.

17. The image-processing method according to claim 16, wherein
the predetermined threshold is a value having a gradation difference of 20 steps or more from a background pixel.

18. The image-processing method according to claim 16, wherein
the predetermined threshold is a value set by binarization with Otsu's method.

19. The image-processing method according to claim 11, wherein
the diagonal direction is a direction of ±45°.

20. A computer program product having a non-transitory tangible computer readable medium including programmed instructions for causing, when executed by a computer, the computer to perform an image-processing method comprising:
acquiring horizontal black hat image data by taking a difference between source image data and horizontal closing image data obtained by performing closing processing on each pixel row of the source image data;
acquiring vertical black hat image data by taking a difference between the source image data and vertical closing image data obtained by performing the closing processing on each pixel column of the source image data;
acquiring logical conjunction image data where a logical conjunction of the horizontal black hat image data and the vertical black hat image data is taken; and
performing dilation processing in a diagonal direction with respect to either a pixel row or a pixel column of the logical conjunction image data and/or in vertical and horizontal directions with respect to either the pixel row or the pixel column of the logical conjunction image data.

* * * * *